United States Patent
Rausch et al.

(10) Patent No.: US 12,459,344 B2
(45) Date of Patent: Nov. 4, 2025

(54) UNDERTRAY COMPONENT WITH A SENSOR DEVICE, AND BATTERY ARRANGEMENT WITH SUCH AN UNDERTRAY COMPONENT

(71) Applicant: AUDI AG, Ingolstadt (DE)

(72) Inventors: Julius Rausch, Heilbronn (DE); Oliver Stoll, Waldbrunn (DE)

(73) Assignee: AUDI AG, Ingolstadt (DE)

( * ) Notice: Subject to any disclaimer, the term of this patent is extended or adjusted under 35 U.S.C. 154(b) by 242 days.

(21) Appl. No.: 18/264,943

(22) PCT Filed: Jan. 24, 2022

(86) PCT No.: PCT/EP2022/051464
§ 371 (c)(1),
(2) Date: Aug. 10, 2023

(87) PCT Pub. No.: WO2022/194431
PCT Pub. Date: Sep. 22, 2022

(65) Prior Publication Data
US 2024/0051380 A1    Feb. 15, 2024

(30) Foreign Application Priority Data
Mar. 15, 2021   (DE) .......................... 102021106169.5

(51) Int. Cl.
| | |
|---|---|
| *B60K 1/04* | (2019.01) |
| *B60L 50/60* | (2019.01) |
| *H01M 10/48* | (2006.01) |
| *H01M 10/613* | (2014.01) |
| *H01M 10/625* | (2014.01) |
| *H01M 50/249* | (2021.01) |
| *B60K 1/00* | (2006.01) |

(Continued)

(52) U.S. Cl.
CPC ................ *B60K 1/04* (2013.01); *B60L 50/60* (2019.02); *H01M 10/482* (2013.01); *H01M 10/613* (2015.04); *H01M 10/625* (2015.04); *H01M 50/249* (2021.01); *B60K 2001/005* (2013.01); *B62D 21/15* (2013.01); *G01B 7/18* (2013.01); *H01M 2220/20* (2013.01)

(58) Field of Classification Search
CPC . B60K 1/04; B60K 2001/005; H01M 10/613; H01M 10/625; H01M 10/482; B60L 50/60; B62D 21/15; G01B 7/18
See application file for complete search history.

(56) References Cited

U.S. PATENT DOCUMENTS 9,966,637 B2 * 5/2018 Cho ..................... H01M 50/249
10,158,106 B2 * 12/2018 Marpu ..................... B60K 6/28
(Continued)

*Primary Examiner* — Edwin A Young
(74) *Attorney, Agent, or Firm* — Maier & Maier, PLLC

(57) ABSTRACT

An underbody component for a motor vehicle, with a plate element which has a lower side and an upper side; at least one supporting element arranged on the upper side of the plate element, which is intended to support the plate element against a vehicle side structure and to space it apart. The supporting element is also designed as a partition, which divides the area above the plate element into multiple chambers; a sensor device which is intended to detect intrusion of the plate element into at least one of the chambers caused by an external force action on the lower side.

15 Claims, 2 Drawing Sheets

(51) Int. Cl.
 *B62D 21/15* (2006.01)
 *G01B 7/16* (2006.01)

(56) References Cited

U.S. PATENT DOCUMENTS

2001/0028163 A1* 10/2001 Breed .................... B60J 10/00
 180/274
2016/0217664 A1* 7/2016 Bradford ................ H04Q 9/00

* cited by examiner a.)

b.)

UNDERTRAY COMPONENT WITH A SENSOR DEVICE, AND BATTERY ARRANGEMENT WITH SUCH AN UNDERTRAY COMPONENT

FIELD

The invention relates to an underbody component for a motor vehicle. The invention also relates to a battery arrangement for a motor vehicle, which comprises such an underbody component.

BACKGROUND

An underbody component of the type in question is used to mechanically protect the underbody of a motor vehicle and/or a vehicle component arranged in the area of the vehicle floor or body floor, in particular a traction battery.

Underbody components are known from the prior art that are equipped with a sensor device in order to be able to detect damage to the underbody component that is caused, for example, by collisions, stone chips, ground impacts, driving over bollards, or the like.

DE 10 2019 207 435 A1 describes a so-called underrun protection which largely absorbs forces acting from below, wherein the complete or partial loss of the structural integrity of the underrun protection is able to be determined by means of a sensor function.

DE 20 2020 102 252 U1 describes a structural component that can be designed as underbody protection for a motor vehicle. The structural component includes a sensor arrangement having at least one optical waveguide, which detects damage to the structural component.

SUMMARY

The invention now provides a further underbody component which is light, offers good protection, and is equipped with a sensor device for detecting damage. With the other independent claim, the invention also extends to a battery arrangement for a motor vehicle. Additional features of the invention result similarly for both subjects of the invention from the dependent claims, the subsequent description of the invention (this explicitly includes also features described as "for example", "preferably", "in particular", etc.), and the drawing.

The underbody component according to the invention for a motor vehicle (motor vehicle underbody component) comprises:
 a plate-like element or plate element, which has a lower side (facing toward the roadway or forming the lower limit contour) and an upper side (facing toward the motor vehicle);
 at least one supporting element arranged on the upper side of the plate element, which is provided to support the plate element against a vehicle-side structure and to space it apart (from this vehicle-side structure), wherein this at least one supporting element is also designed as a partition wall or the like, which divides the area above the plate element into multiple (i.e., into at least two) chambers or chamber-like compartments (the underbody component according to the invention can in this respect also be referred to as a multichamber underbody component);
 a sensor device which is provided for sensing or detecting an intrusion of the plate element into at least one of the chambers caused by external force action from below or by external force action on the lower side (of the plate element).

Such an intrusion of the plate element into at least one of the chambers is usually also accompanied by damage to the underbody component or a loss of its structural integrity and can addition-ally also indicate damage to the underbody to be protected or vehicle component to be protected. The sensor device provided enables the underbody component to be monitored, as it were, in order to ensure that such damage, in particular critical damage, does not go unnoticed.

The plate element can be manufactured from plastic, in particular fiber-reinforced plastic. The plate element can also include a foamed core, in particular a plastic foam core, which is arranged between outer layers or cover layers, in particular CFRP or GRP cover layers. The supporting element can also be manufactured from plastic, in particular fiber-reinforced plastic.

The underbody component according to the invention can include only one supporting element, which is also designed as a partition wall, or multiple such supporting elements. A supporting element can also be designed in such a way that it comprises multiple partition wall sections.

The plate element and the at least one supporting element can be manufactured separately and connected to one another in a suitable manner. Preferably, the plate element and the supporting element are integrally formed, i.e., manufactured in one piece, for example as an injection mold-ed or extruded part.

The sensor device preferably includes at least one electrically conductive sensor wire which is arranged in or on the plate element, in particular on the upper side. Deformation of the plate element results in a corresponding deformation, in particular lengthening or stretching, of the sensor wire and in a detectable change, in particular increase, of the electrical resistance of the sensor wire, wherein a tearing of the sensor wire, which cannot be ruled out, results in an infinitely high resistance. The intensity of the force action or the degree of damage resulting therefrom can also be at least approximately ascertained (the stronger the deformation is, the higher the resistance change) by a quantitative detection of the resistance change (of the electrical resistance of the sensor wire). Furthermore, it is then also possible to assess whether the detected damage is critical or non-critical. In this case, temperature compensation can also take place in order to rule out incorrect measurements caused by temperature fluctuations. The sensor wire can be made of metal or a metal alloy and also of carbon (carbon fiber). The sensor wire is preferably provided with electrical insulation, for example an insulating varnish.

It is preferably provided that the sensor wire is laid in a meandering manner or has a meandering course, in particular in such a way that the area in question can be detected by sensors essentially over its entire surface.

At least one sensor wire, in particular a meandering sensor wire, can be provided, which covers multiple chambers over at least one supporting element or over at least one partition wall, by which intrusion of the plate element into at least one of these chambers can be detected. This enables a relatively simple and cost-effective construction of the underbody component with a few sensor wires (possibly only one sensor wire) and possibly also locating of damage in certain areas. On the other hand, for individual chambers, in particular for each chamber, at least one sensor wire, in particular a meandering sensor wire, can be provided in order to be able to detect the intrusion of the plate element into the respective chamber. This enables the precise location of damage or the assignment of detected damage to a specific chamber.

A battery arrangement according to the invention for a motor vehicle (motor vehicle battery arrangement), in particular for a passenger vehicle, comprises at least the following components:
- a traction or driving battery formed having a housing;
- a cooling device forming the housing bottom or arranged below the housing bottom for cooling the traction battery;
- (at least) one underbody component according to the invention arranged below the cooling device or below the housing bottom, which is supported with its at least one supporting element against the cooling device and/or (directly) against the housing bottom.

Thus, between the cooling device and the plate element of the underbody component there is a spacer area divided into several chambers or chamber-like compartments, by which the cooling device is particularly well protected. The battery housing preferably includes multiple chambers for accommodating battery modules or the like, wherein the chambers of the underbody component are arranged in particular (at least approximately) congruently with the chambers of the battery housing, so that the chambers are more or less one on top of another in the z-direction. This enables particularly effective support of the underbody component on the battery housing in accordance with the load path.

The battery arrangement according to the invention can also comprise an evaluation device or the like (for example a control unit), which is designed to detect any damage to the underbody component (due to intrusion of the plate element into at least one of the chambers), by evaluating sensor data (of the sensor device), in particular by detecting resistance changes of at least one sensor wire (see above). The evaluation device can also be designed to also locate such damage (if the sensor device is designed accordingly) and/or to determine the degree of damage of the damage and, if necessary, also to distinguish critical damage from non-critical damage. As a result, suitable protective measures to avert danger can be initiated automatically, such as issuing a warning message to the driver, switching off the vehicle drive, preventing a charging process, etc.

BRIEF DESCRIPTION OF THE FIGURES

The invention will be described in greater detail below in reference to the drawings. The features shown in the schematic figures of the drawing and/or the features explained below can be general features of the invention, even independently of specific combinations of features, and refine the invention accordingly. In addition, the possible embodiments of the invention shown in the figures can also be combined with one another within the scope of the invention.

DETAILED DESCRIPTION

Figure 1:
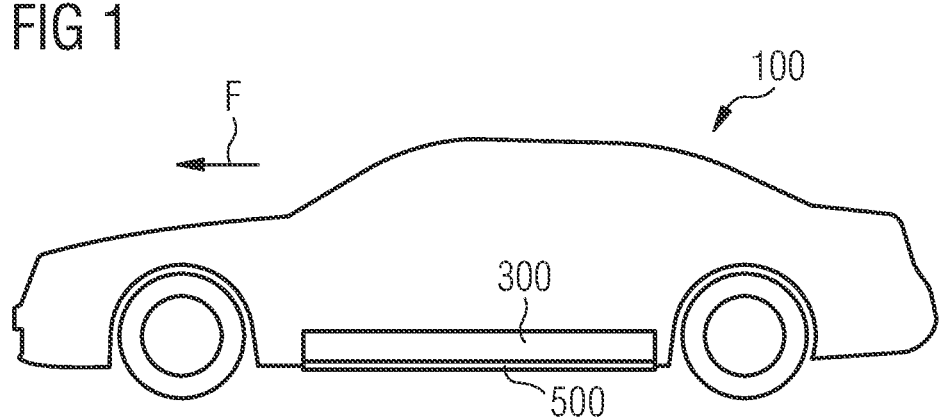
FIG. 1 shows a motor vehicle having a battery arrangement according to the invention.

The motor vehicle 100 shown in FIG. 1, wherein it is, for example, an at least partially electrically driven passenger vehicle, includes a traction battery 300 which is arranged in the area of the vehicle floor and which is protected downwards, i.e., in the direction of the roadway, by an underbody component 500 according to the invention. The underbody component 500 is predominantly manufactured from fiber-reinforced plastic (PRP). The traction battery 300 and the underbody component 500 form a battery arrangement 200 according to the invention (see FIG. 2).

Figure 2:
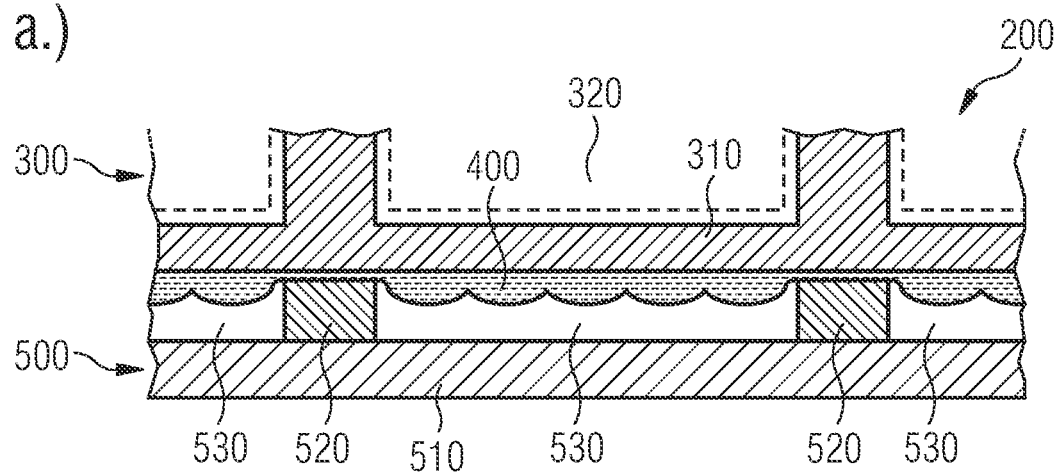
FIG. 2 illustrates a section of the structure of the battery arrangement from FIG. 1 (without force action and with force action).
Figure 2:
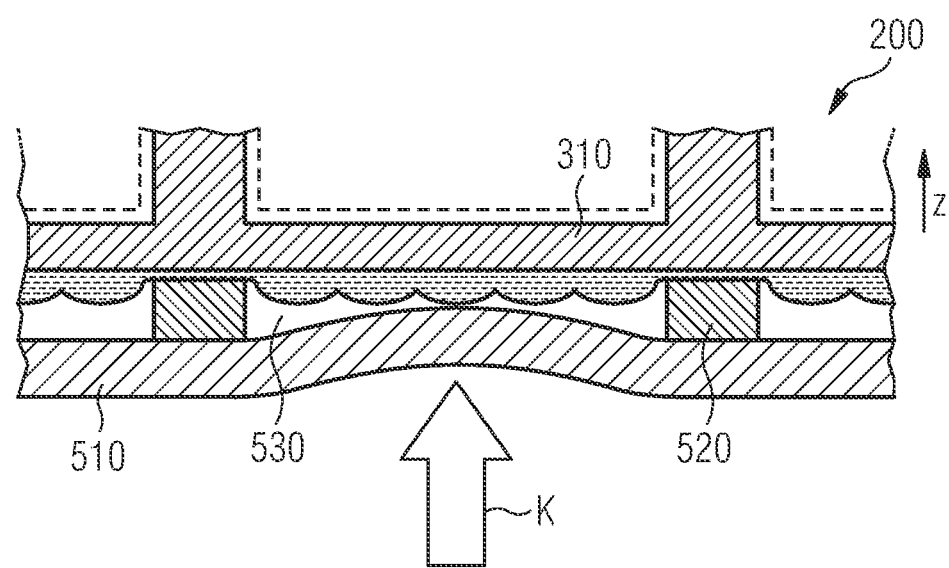

FIG. 2 illustrates the structure of such a battery arrangement 200. The battery arrangement 200 comprises the traction battery 300 formed having a housing (battery box or the like), a cooling device 400 (which contains a cooling channel structure, for example) arranged below the housing bottom 310, and the underbody component 500 arranged below the cooling device 400. The housing of the traction battery 300 includes multiple chambers in which battery modules 320 are arranged. The underbody component 500 includes a flat plate or floor element 510.

Furthermore, multiple supporting elements 520 belonging to the underbody component 500 are provided, which support the plate element 510 against the cooling device 400 or possibly also directly against the housing or the housing bottom 310 (so that the cooling device 400 is located between the supporting elements 520). These supporting elements 520 are ridges or elevations that are arranged on the upper side of the plate element 510. The supporting elements 520 also function at the same time as spacers, which space apart the plate element 510 from the cooling device 400 and from the housing bottom 310. The supporting elements 520 can be integrally formed in one piece with the plate element 510. The underbody component 500 can be fastened by means of screwing through the supporting elements 520.

The supporting elements 520 are also designed as partition walls or the like (see also FIGS. 3 to 5), which divide the area above the plate element 510 into multiple chambers 530. The chambers 530 improve the protective effect of the underbody component 500 by providing quasi-stable deformation free spaces for the plate element 510, which extend in the z-direction between the upper side of the plate element 510 and the cooling device 400, as shown in FIG. 2a. A force action K (for example an impact) from below can result in a deformation of the plate element 510 in the z-direction, wherein the plate element 510 intrudes into at least one of the chambers 530, as illustrated in FIG. 2b. This is usually accompanied by damage to the underbody component 500 or a loss of structural integrity and can also result in damage to the cooling device 400 and/or the traction battery 300 despite the deformation free space.

The underbody component 500 is equipped with a sensor device that is intended to detect an intrusion of the plate element 510 into at least one of the chambers 530 (as shown in FIG. 2b) caused by an external force action K on the lower side, so that if necessary suitable protective measures can be initiated as described above.

Figure 3:
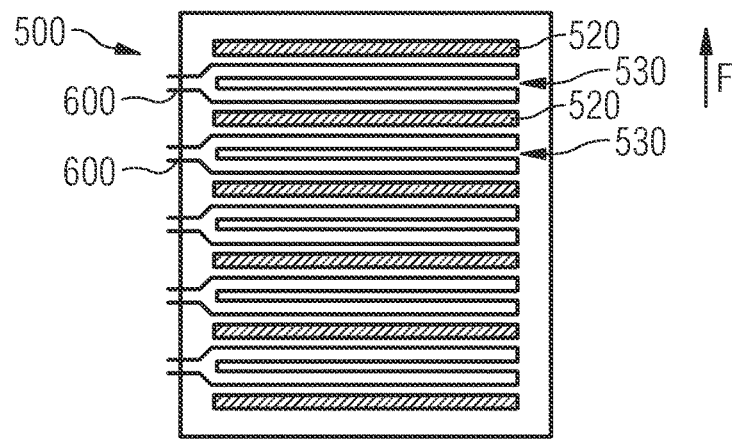
FIG. 3 shows a top view of a possible embodiment of an underbody component of the battery arrangement from FIG. 1 and FIG. 2.

FIG. 3 shows a possible embodiment of the sensor device, in which multiple electrically conductive sensor wires 600 are arranged in or on the plate element 510, in particular on its upper side, such that a sensor wire 600 with a meandering course is provided for each chamber 530, wherein the sensor field (sensor surface) formed by the respective sensor wire 600 covers the respective area between the supporting elements or partition walls 520 essentially over the entire surface. The sensor wires 600 are contacted in a suitable manner A deformation of the plate element 510 (as shown in FIG. 2b, for example) results in a detectable change in the electrical resistance of the relevant sensor wire 600. The evaluation can take place with the aid of an evaluation device, as described above.

Figure 4:
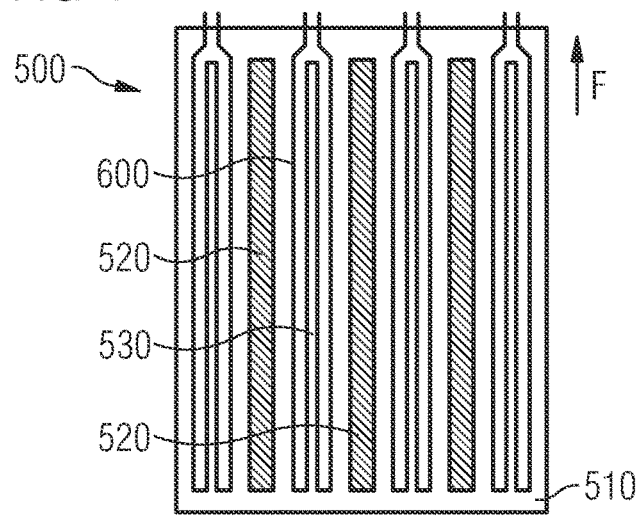
FIG. 4 shows a top view of a further possible embodiment of an underbody component of the battery arrangement from FIG. 1 and FIG. 2.
Figure 5:
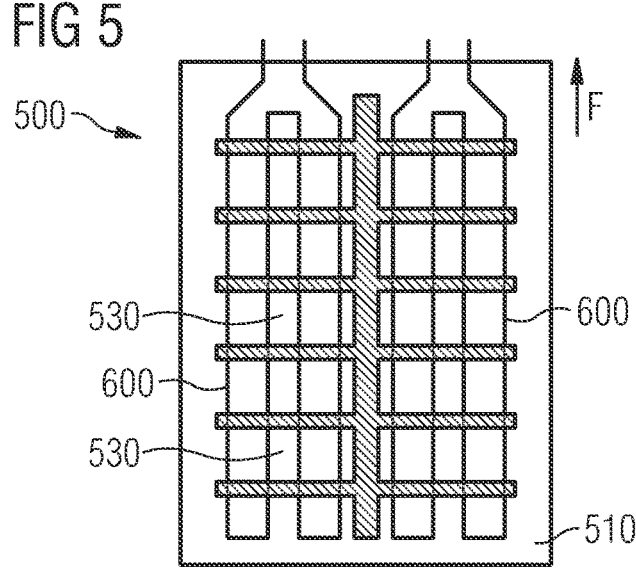
FIG. 5 shows a top view of a further possible embodiment of an underbody component of the battery arrangement from FIG. 1 and FIG. 2.

In the first possible embodiment shown in FIG. 3, the supporting elements or partition walls 520 are arranged extending transversely with respect to the direction of travel F of the motor vehicle 100. FIG. 4 shows a second possible embodiment, in which the supporting elements or partition walls 520 are arranged extending longitudinally with respect to the direction of travel F. FIG. 5 shows a third possible embodiment, in which transversely and longitudinally extending supporting elements or partitions 520 are provided, which more or less form multiple compartments. The sensor wires 600 are arranged here in such a way that the sensor fields formed there-by each cover multiple chambers 530.

The underbody components 500 shown in FIGS. 3 to 5 can be formed with a side wall or the like (not shown), in particular a completely circumferential side wall. Moreover, an underbody component 500 according to the invention is not limited to the preferred use described above (for a traction battery), but can also be used in other ways.

The invention claimed is:

1. An underbody component for a motor vehicle, comprising
 a plate element which has a lower side and an upper side; and
 at least one supporting element arranged on the upper side of the plate element, which is intended to support the plate element against a vehicle-side structure and to space it apart from this vehicle-side structure, wherein the at least one supporting element is also designed as a partition, which divides an area above the plate element into multiple chambers; and
 a sensor device which includes at least one electrically conductive sensor wire which is arranged in or on the plate element, wherein this sensor device is intended to detect intrusion of the plate element into at least one of the chambers caused by an external force action on the lower side.

2. The underbody component according to claim 1, wherein the plate element and the at least one supporting element are integrally formed.

3. The underbody component according to claim 2, wherein the at least one sensor wire has a meandering course.

4. The underbody component according to claim 2, wherein the at least one senor wire is provided which covers the multiple chambers.

5. The underbody component according to claim 2, wherein a sensor wire is provided for each chamber.

6. The underbody component according to claim 1, wherein the at least one sensor wire has a meandering course.

7. The underbody component according to claim 6, wherein the at least one sensor wire is provided which covers the multiple chambers.

8. The underbody component according to claim 6, wherein a sensor wire is provided for each chamber.

9. The underbody component according to claim 1, wherein the at least one sensor wire is provided which covers the multiple chambers.

10. The underbody component according to claim 1, wherein a sensor wire is provided for each chamber.

11. A battery arrangement for the motor vehicle, comprising:
 a traction battery formed having a housing;
  a cooling device forming a housing bottom or arranged below the housing bottom;
  the underbody component which is designed according to claim 1 and is arranged below the cooling device, which is supported with the at least one supporting element against the cooling device and/or against the housing bottom.

12. The battery arrangement according to claim 11, wherein the battery housing includes multiple chambers for accommodating battery modules, wherein the chambers of the underbody component are arranged congruently with the chambers of the battery housing.

13. The battery arrangement according to claim 12, further comprising an evaluation device which is designed to determine damage to the underbody component by evaluating sensor data from the sensor device.

14. The battery arrangement according to claim 11, further comprising an evaluation device which is designed to determine damage to the underbody component by evaluating sensor data from the sensor device.

15. The battery arrangement according to claim 14, wherein the evaluation device is also designed to locate the damage and/or to determine a degree of the damage.

* * * * *